United States Patent [19]
Bercovitz

[11] Patent Number: 5,034,616
[45] Date of Patent: Jul. 23, 1991

[54] DEVICE FOR OPTICALLY SCANNING SHEET-LIKE DOCUMENTS

[75] Inventor: Christian Bercovitz, Bonne, France

[73] Assignee: Landis & Gyr Betriebs AG, Zug, Switzerland

[21] Appl. No.: 493,281

[22] Filed: Mar. 14, 1990

[30] Foreign Application Priority Data

May 1, 1989 [CH] Switzerland ........................ 1648/89

[51] Int. Cl.[5] ........................................ G06K 5/00
[52] U.S. Cl. ........................ 250/556; 250/227.31; 356/71
[58] Field of Search .............. 250/556, 223 R, 227.31; 356/71, 444

[56] References Cited

U.S. PATENT DOCUMENTS

| | | | |
|---|---|---|---|
| 3,606,941 | 9/1971 | Bayha | 250/556 |
| 3,761,876 | 10/1973 | Flaherty et al. | 340/146.3 |
| 3,922,557 | 11/1975 | Carnes, Jr. | 250/578 |
| 4,056,731 | 11/1977 | Bayha | 250/556 |
| 4,204,765 | 5/1980 | Iannadrea et al. | 250/556 |
| 4,319,137 | 3/1982 | Nakamura et al. | 250/556 |
| 4,736,099 | 4/1988 | Zelinka | 356/444 |
| 4,881,268 | 11/1989 | Uchida et al. | 250/556 |
| 4,922,109 | 5/1990 | Bercovitz et al. | 250/556 |

FOREIGN PATENT DOCUMENTS

| | | |
|---|---|---|
| 0070621 | 1/1983 | European Pat. Off. . |
| 0109490 | 8/1988 | European Pat. Off. . |
| 0198819 | 8/1988 | European Pat. Off. . |
| 661603 | 7/1987 | Switzerland . |
| 2159268 | 11/1985 | United Kingdom . |

*Primary Examiner*—David C. Nelms
*Assistant Examiner*—Stephone Allen
*Attorney, Agent, or Firm*—Marmorek, Guttman & Rubenstein

[57] ABSTRACT

For automatic recognition of the authenticity of items in sheet form such as bank notes, for example in an automatic service machine, the transparency of each bank note is examined in predetermined spectral ranges. The measuring system is arranged between units of a transport system and, in a passage opening formed from a collector and a diffuser, produces a narrow read-out light beam which extends transversely over a scanning plane. The bank note is conveyed through the read-out light beam, and the light which shines through the bank note in the read-out area is collected in the collector and passed to a photosensitive detector. An evaluation device forms a single measurement value in respect of transparency in the spectral range for each of the successively scanned read-out areas, and compares the measurement values of the bank note being tested with pattern signals stored in a memory of the evaluation device.

17 Claims, 2 Drawing Sheets

DEVICE FOR OPTICALLY SCANNING SHEET-LIKE DOCUMENTS

BACKGROUND OF THE INVENTION

1. Field of Invention

This invention relates to a testing apparatus for an item in sheet form, and in particular to such testing apparatus provided with a measuring system having a light source and a photosensitive detector.

Such testing apparatus is advantageously used in bank note acceptors such as those used in automatic service machines.

2. Description of the Prior Art

Testing apparatus of this kind is known from U.S. Pat. Nos. 3 761 876 and 4 319 137, in which a bank note is optically scanned line by line by means of a linear array of a plurality of detectors. Each line is broken down into an equal number of picture elements, in accordance with the number of detectors. It is also known from U.S. Pat. No. 4 319 137 that the items which are judged genuine may also have patterns from a predetermined set, and that the items are transported by means of endless belts.

Swiss Patent Specification No. 661 603 describes a transport system which provides for careful transportation of bank notes of different sizes by means of endless belts.

It is also known from European Patent Application Serial No. 109 490 for only small surface portions of the bank note to be examined in a reflection mode, in order to detect soiling of or damage to the bank note.

European Patent Application Serial No. 198 819 describes a method in which the light which experiences a spectral variation due to the entire surface of the bank note in a transmission or a reflection mode is analyzed by at least one detector in order to establish the authenticity of the bank note, irrespective of its position in the testing device.

SUMMARY OF THE INVENTION

It is an object of the present invention to provide a simple testing apparatus which optically transilluminates an item in sheet form in a line-wise manner for recognition purposes over the entire surface thereof.

According to the present invention there is provided a testing apparatus for an item in sheet form, the testing apparatus comprising a measuring system including a light source for producing a readout light beam and at least one photosensitive detector for line-by line optical scanning of the item in at least one predetermined spectral range, wherein the read-out light beam is of a rectangular cross-section and illuminates the item in a read-out area of a scanning plane; a transport system for transporting the item; and an evaluation device connected to the detector, for converting signals from the detector into measurement values; wherein the measuring system comprises on one side of the scanning plane an optical collector associated with the detector, and on the other side of the scanning place, in opposite relationship to the collector, the light source provided with a diffuser, wherein the transport system comprises two transport units between which the collector and the diffuser form a passage opening for the item, wherein the collector is arranged to collect light which shines through the item in the entire read-out area, and wherein the evaluation device is operable to form a single measurement value in respect of transparency in the respective spectral range for the entire read-out area in each scanning operation.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
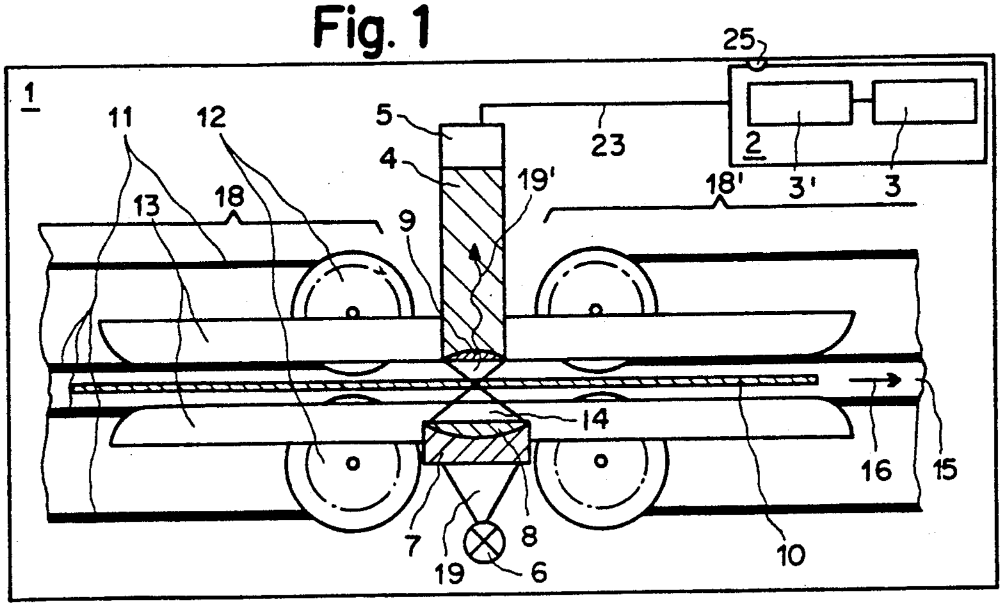
FIG. 1 shows a testing apparatus in section in a transport direction.

In FIG. 1, a bank note reader 1 includes an evaluation device 2 with a memory 3 and a computing unit 3'. The bank note reader 1 includes a measuring system which comprises an optical collector 4 upstream of a photosensitive detector 5 and a light source 6 with a diffuser 7. The optical properties of the measuring system are improved, for example, by a first cylindrical lens 8 in the diffuser 7 and a second cylindrical lens 9 upstream of the collector 4, which are arranged on the sides facing towards an item in sheet form such as a bank note 10. A transport system for the hank notes 10 has belts 11, direction-changing rollers 12 and guide skids 13.

A read-out beam 14 is defined by the diffuser 7 in a transport plane 15 of the bank note 10. The transport system conveys the bank note 10 in a transport direction 16, for example in the longitudinal direction of the bank note 10.

Figure 2:
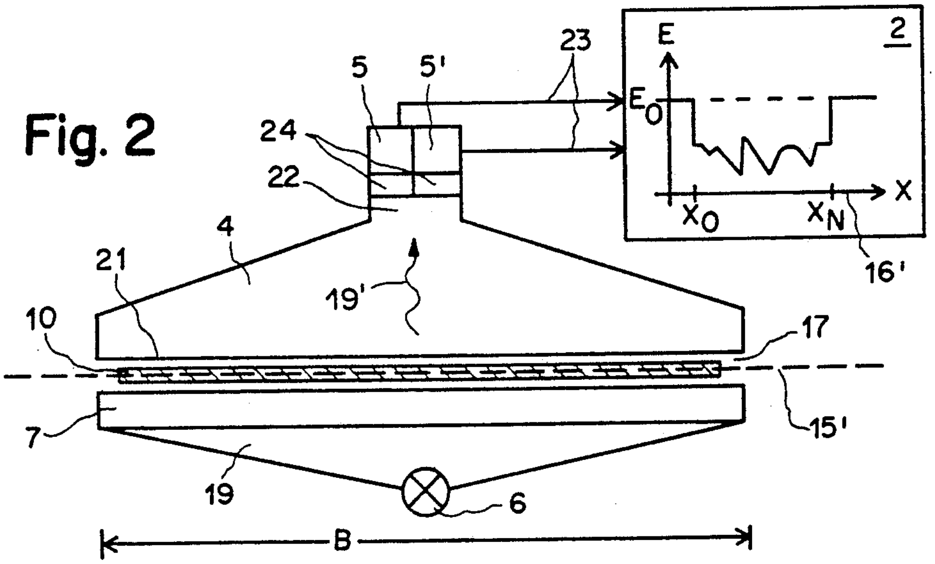
FIG. 2 shows the testing apparatus illustrated in FIG. 1 in section transversely to the transport direction.

The light source 6 and the diffuser 7 beneath the transport plane 15, and the collector 4 and at least one detector 5 above the transport plane 15 form a minimum measuring system. The collector 4 and the diffuser 7 extend transversely over a useful width B (see FIG. 2) of the transport system and are arranged parallel at a predetermined spacing from each other in such a way that the collector 4 and the diffuser 7 form for the bank note 10 a slot-like passage opening 17 of the width B, which defines a scanning plane 15'. The scanning plane 15' coincides in the opening 17 with the transport plane 15 (see FIGS. 1 and 2), with the two planes 15 and 15' being normal to the plane of the drawing.

As well as the components 11 through 13, the transport system includes drive means (not shown) and is divided into at least two transport units 18 and 18' on the two sides of the measuring system. For the sake of clarity, only the components 11 through 13 of the first of the two transport units 18 and 18' illustrated are provided with reference numerals. The direction-changing rollers 12 rotate about axes which are normal to the plane of the drawing, and guide the belts 11 in pairs symmetrically with respect to the transport plane 15 in such a way that in the transport plane 15, the bank notes 10 are clamped in known manner between the belts 11 of a pair, are passed in the transport direction 16 to the opening 17 and are conveyed away on the other side.

The two transport units 18 and 18' are spaced from each other in such a way that, when passing through the measuring system, even the shortest bank note 10 from a predetermined set of nominal values entirely leaves the belts 11 of the first transport unit 18 only when the second transport unit 18' has already engaged the bank note 10. The guide skids 13 are advantageously arranged above and below the transport plane 15 and on both sides of the opening 17 to provide for exactly guiding the bank note 10, in order to prevent a bank note 10 which is not entirely flat from becoming jammed at the opening 17.

Above or below the plane of the drawing in FIG. 1, at least one pair of identical transport units 18 and 18' is advantageously arranged parallel to same. The number of those parallel transport units 18 and 18' is predetermined by the greatest predetermined width of the bank notes 10 which are to be transported through the measuring system without damage.

The spacings of the light source 6, the diffuser 7, the collector 4 and the detectors 5 from the transport plane 15 depend on the optical properties of the means used for the components 4 and 6 through 9.

The light source 6 advantageously produces white light 19 which is generated, for example, by a halogen lamp. However, it is also possible to use monochromatic light 19, for example from a light emitting diode, or hybrid light consisting of different color components, for example from a gas discharge lamp.

Figure 3:
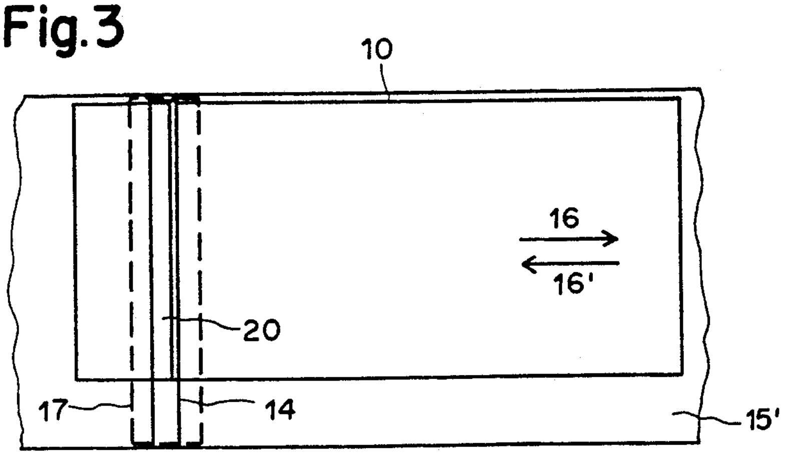
FIG. 3 shows a view of a bank note with a read-out area.

Light 19 from the light source 6 is focused by the diffuser 7 with optical means to provide the read-out light beam 14 which in cross-section in the scanning plane 15' (see FIG. 3) is in the shape of a long narrow rectangle and which extends transversely over the entire opening 17, the intensity of the read-out light beam 14 being uniformly distributed in the scanning plane 15'. An aperture advantageously delimits the read-out light beam 14 in the opening 17. The aperture is, for example, a part of the opening 17. In the transport direction 16, the dimension of the read-out light beam 14 is only a few millimeters, advantageously less than 5 mm.

The read-out light beam 14 (see FIGS. 2 and 3) passes through the scanning plane 15' in the opening 17 and provides transillumination in respect of a rectangular read-out area 20 of the bank note 10 which is in the opening 17. Under the control of the evaluation device 2, the bank note 10 is pushed through the read-out light beam 14 in the transport direction 16, with the read-out area 20 passing stepwise over the entire surface of the bank note 10. For each step, the evaluation device 2 associates with the read-out area 20 a value X in respect of a read-out direction 16' which is opposite to the transport direction 16.

Light 19' which is altered by the bank note 10 (see FIG. 2) Passes into the collector 4 through an entrance side 21 which is towards the scanning plane 15'; the collector 4 collects the light 19'for the detectors 5, 5'. The collector 4 tapers, for example, towards the detectors 5, 5' into a connecting portion 22 which distributes the light 19' to the detectors 5, 5'. Each detector 5, 5' converts the light 19' which is incident thereon through a window of the respective detector 5, 5' into an electrical signal E, in proportion to the intensity of the light. The detectors 5 and 5' are connected to the evaluation device 2 by way of lines 23 which feed the sIgnals E to the evaluation device 2.

A filter 24 with a predetermined spectral transmission characteristic is advantageously arranged between the connecting portion 22 and the window of each detector 5 and 5', so that each detector 5 and 5' has a respective sensitivity to light 19', the spectral range of which is limited by the filter 24.

The optical configuration of the bank notes 10 of the predetermined set of nominal values determines the number of detectors 5, 5' which are required, and the appropriate transmission characteristics of the filter 24. An advantageous embodiment of the bank note reader 1 has four different spectral ranges. They lie, for example, in the respective ranges of blue, yellow-green, red and infrared light.

As long as there is no bank note 10 in the opening 17, the detectors 5 and 5' register the intensity and the spectral distribution of the read-out light beam 14. In the evaluation device 2, the signal E has a reference level $E_O$ which is particular to each spectral range.

The usual bank notes 10 (see FIGS. 2 and 3) of each nominal value comprise a predetermined sheet of paper and have a predetermined colored pattern printed thereon, on both sides. The light 19' which passes through the bank note 10 in the read-out area 20 is attenuated and altered in respect of spectral distribution in a predetermined manner by the transparency of the paper and the patterns and by any security thread that may be provided. Therefore, while the bank note 10 is passing through the opening 17, the intensity and the spectrum of the light 19' which passes through the bank note 10 are altered, in a predetermine function in respect of the values X in the read-out direction 16', said function being characteristic of each nominal value of the bank note 10.

The transparency of the bank note 10 is averaged over the entire read-out area 20 as only a single signal E is produced for each predetermined spectral range. In the evaluation device 2, the computing unit 3' receives the instantaneous value of the signal E in each stepping movement of the transport system and forms only a single measurement value in respect of transparency for each of the predetermined spectral ranges for the entire read-out area 20.

The computing unit 3' advantageously standardizes all measurement values in respect of transparency to the reference level $E_O$ of the corresponding spectral range prior to the storage operation, in order to eliminate the influences, which are dependent on the operating time, of the light source 6 and the sensitivity of the detectors 5 and 5'. The measurement values are stored in the memory 3, together with the value X in respect of the read-out direction 16'.

The above-described bank note reader has the advantage that the same measurement values are stored in the same sequence, irrespective of whether it is the front side or the rear side which is towards the collector 4, provided only that the scanning operation begins at a predetermined edge of the bank note 10.

When the bank note 10 passes into the read-out light beam 14, the level of the signal E falls away markedly from the reference level $E_O$. The evaluation device 2 associates the first read-out area with the location $X=X_O$. The bank note 10 covers the distance through the opening 17 in, for example, N steps, with the N read-out areas 20 passing successively over the bank note 10 in such a way as to cover the surface thereof. For each of the detectors 5 through 5′, that is to say for each predetermined spectral range, N measurement values are stored in the memory 3, with the associated values $X_O$ through $X_N$. After the N-th measurement, the signal E equally markedly rises again to the reference level $E_O$ when the bank note 10 has left the read-out light beam 14 at the location $X=X_{N+1}$. The value of the difference $X_N-X_O$ is proportional to the length of the bank note 10, with the values $X_O$ through $X_N$ advantageously being uniformly distributed in the read-out direction 16′.

As the read-out light beam 14 extends over the entire width B of the opening 17 and, on the other hand, the transverse dimension of the bank note 10 is at most equal to or less than B, a predetermined proportion of unaltered light 19 of the read-out light beam 14 also passes into the collector 4, besides the light 19′ which is altered by the bank note 10, depending on the transverse dimension of the bank note 10. The drop in the signal E therefore depends not only on the transparency of the bank note 10 but also on the width of the bank note 10, in which respect the drop in the level of intensity and the variation in the spectral composition of the light 19′ is less strongly pronounced for narrow bank notes 10 than when dealing with wide bank notes. The precise position of the bank note 10 in the opening 17 does not influence the signal E, and therefore there is the advantage that there is no need for a means for precisely laterally guiding the bank note 10 in the opening 17.

The banknote reader 1 compares the measurement values in respect of transparency of a bank note 10 to be identified, with pattern values of a predetermined set of nominal values which are stored in the memory 3. For the purposes of determining the length of the bank note 10, the computing unit 3′ (see FIGS. 1 and 2)investigates whether the number N of measurement values is identical to the number of pattern values for each nominal value of the predetermined set. If the bank note 10 is of the same length as one from the predetermined set of nominal values, then, for each predetermined spectral range, the evaluation device 2 forms in known manner for each value X the difference between the measurement value in respect of transparency, which is standardized to the reference level $E_O$, and the correspondingly standardized pattern value in respect of that nominal value. A correlation value is computed from the N differences in respect of each of the predetermined spectral ranges and compared to a limit value which is set at a predetermined magnitude. The bank note 10 is only recognized as that nominal value if the correlation values lie above the limit values thereof. If that condition is not met, the bank note 10 is rejected as unidentifiable.

If a plurality of nominal values are of the same length as the bank note 10 to be tested and if the correlation values are above the limit values, then associated with the bank note 10 is that nominal value whose pattern values have the best correlation with the measurement values in respect of transparency.

The predetermined set of measurement values can be produced by reading off bank notes 10 from a predetermined set of the predetermined nominal values by means of the bank note reader itself, when the bank note reader is brought into operation or upon inspection thereof. It is also possible to provide for transfer of the pattern values stored in the memory 3 from a first bank note reader 1 to another of the same design configuration.

For example, the measurement values in respect of transparency of a bank note 10 which is recognized as genuine are advantageously used for modifying the pattern values of that nominal value. The bank note reader 1 is thus adapted to minor differences between the different series of the same nominal value, and this reduces the number of genuine bank notes 10 which are rejected.

The evaluation device 2 advantageously produces a digital output signal at an output 25, as the result of the evaluation operation. The digital output signal corresponds, for example, to a number which is associated in predetermined fashion with the nominal value of the recognized bank note 10, or has a predetermined error code if the evaluation device 2 classifies the bank note 10 as being unidentifiable.

The computing unit 3′ advantageously also compares for each spectral range the N measurement values which are called up from the memory 3 in the reverse sequence $X_N \ldots X_O$, to the N measurement values of the sequence $X_O \ldots X_N$ in that way, the bank note reader 1 recognizes bank notes 10 irrespective of one of the four possible positions in the opening 17, so that there is the advantage that there is no need for a mechanical turning device upstream of the bank note reader 1.

A bank note 10 which is, for example, 20 centimeters in length is read off over the surface thereof in 50 steps, with the read-out light beam 14 being of a width of 4 mm as measured in the read-out direction 16′, by means of a bank note reader 1 which measures simultaneously in four spectral ranges. The evaluation device 2 produces fifty measurement values from the signals E of the four detectors 5 through 5′ in each of four spectral ranges, that is to say the entire bank note 10 is characterized by only 200 measurement values. This is advantageous in regard to recognition of the bank note 10 from a large number of predetermined nominal values, and permits a recognition procedure to be carried out quickly.

A continuous forward feed is also advantageous, in which case the bank note 10 is moved in the entire transport system at a uniform speed so that the bank note 10 is processed with a considerable amount of care. Driven by one of the direction-changing rollers 12, a known means (not shown) produces a synchronizing signal which is fed in the evaluation device 2 to a counter (not shown). The synchronizing signals are staggered in respect of time in such a way that a synchronizing signal always occurs whenever the bank note 10 has been moved by the width of the read-out area 20. As long as the signal E is at the reference level $E_O$, the counter is switched off and is set to a counter condition of zero. As soon as the signal E falls below the reference level $E_O$, the counter is switched on and the counter condition which is increased by one is taken over by the memory 3, after each synchronizing signal. The counter condition serves as the value X which numbers the read-out areas 20 or the measurement values in respect of transparency, in the sequence of the scanning operation.

The measured transparency values of the read-out areas 20 which are arranged in a row over the bank note 10 to cover the surface thereof are sufficient for recognition of bank notes 10 from the predetermined set of nominal values. It is even possible for the measurement values in respect of transparency to be ascertained and stored in a predetermined manner only in respect of, for example, every second step. Depending on the nature of the printed patterns on a bank note 10, that reduced set of measurement values is sufficient for identification of the bank note 10 or orientation thereof in the bank note reader 1.

It is also possible for the measuring system to be of a design configuration in which the bank notes 10 are read off in a transverse format, in which case the width B defines the greatest length thereof.

Figure 4:
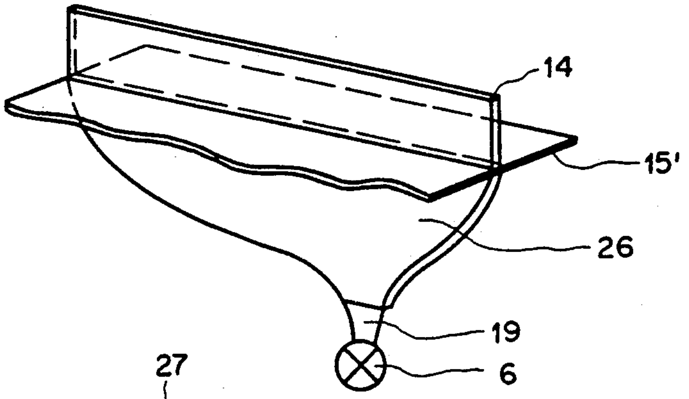
FIG. 4 shows an illuminating device with light guides.

In another embodiment shown in FIG. 4, the diffuser 7 and the cylindrical lens 8 are advantageously replaced by light guides 26, by means of which the light 19 from the light source 6 is guided to the scanning plane 15'. The light guides 26 are, for example, in the form of a bundle of thin fibers of plastics material. The cross-sectional configuration of the light guides 26 is adapted at one end to the light source 6, while at the other end, the bundle terminates in normal relationship on the scanning plane 15' and is of the cross-sectional shape of the read-out light beam 14.

Figure 5:
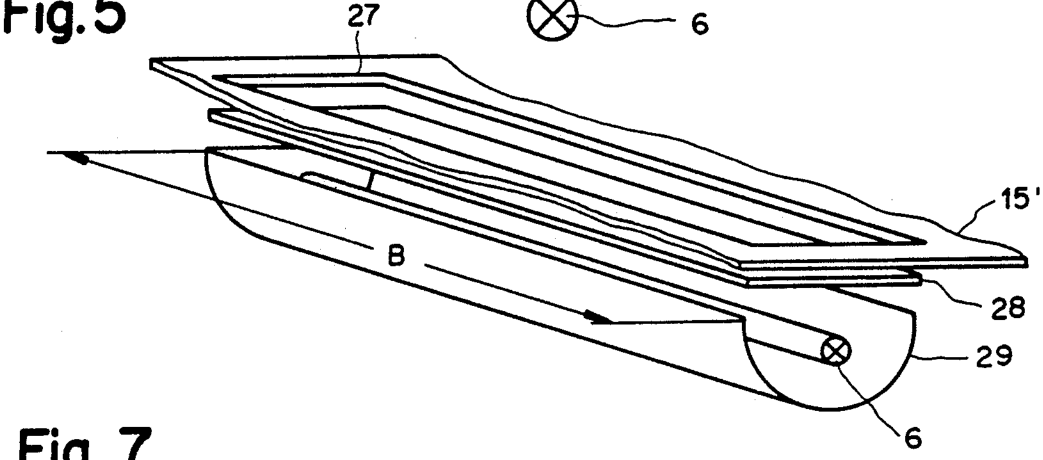
FIG. 5 shows an illuminating device with a mirror and a linear light source.

The read-out light beam 14 can also be formed by means of a rectangular aperture 27 which is let into the scanning plane 15', as shown in FIG. 5. If the light source 6 is of a linear extent corresponding to the length B, then a ground-glass plate 28 will produce uniform distribution in respect of the strength of illumination in the aperture 27, while a channel-like mirror 29 with the cross-sectional configuration of a parabola or another astigmatic optical image-forming system advantageously enhances the light output of the light source 6.

Figure 6:
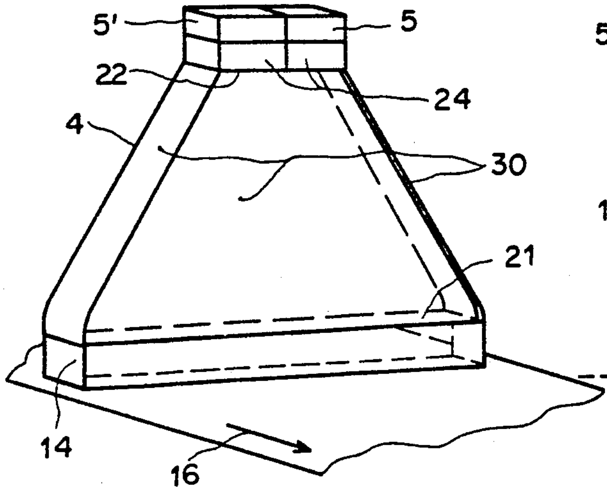
FIG. 6 shows a funnel-shaped collector.

The collector 4, as shown in FIG. 6, is at least of the same dimension in the transport direction 16 as the read-out light beam 14 on the entrance side 21. In the simplest form, the collector 4 comprises a plate of light guide material, for example a transparent plastics material or glass, and is advantageously of a trapezoidal form or is in the form of a flat, non-hollow funnel of rectangular cross-section which tapers towards the connecting portion 22 transversely with respect to the transport direction 16.

Figure 7:
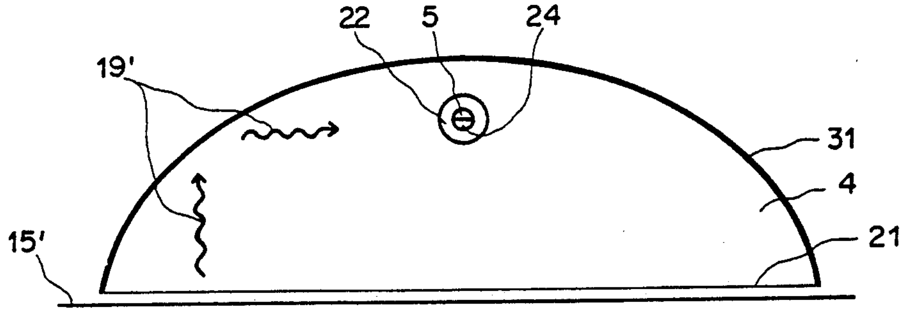
FIG. 7 is a view in section of a collector with an astigmatic image-forming system.

Referring to FIG. 7, for the collector 4 it is also possible to use an astigmatic image-forming system over the scanning plane 15', at least one filter 24 and detector 5 being disposed in the focal line thereof, while the cross-section of the opening thereof is at least of the same dimensions as the entrance side 21. All light 19' which passes through the entrance side 21 is collected in the collector 4 at the focal line of the image-forming system. In the construction shown in FIG. 7, the collector 4 comprises a light guide plate, the edge of which has a flat edge surface at the entrance side 21 and an edge surface 20 which is curved in a parabolic configuration. Let into the light guide plate is the connecting portion 22 which encloses the focal line of the edge surface 30 and which guides the light 19' to the filter 24 and the detector 5.

The light guide plate of the collector 4 advantageously has a reflective coating 31, as shown in FIG. 7, on all surfaces with the exception of the entrance side 21 and the surface of the connecting portion 22, which promotes total reflection at the interfaces of the light guide plate.

Another suitable form of collector 4 is a mirror system whose reflective surfaces are in the shapes of the surfaces, which are covered with the coating 31, of one of the above-described collectors 4, and which encloses a space which is only filled with air.

Figure 8:
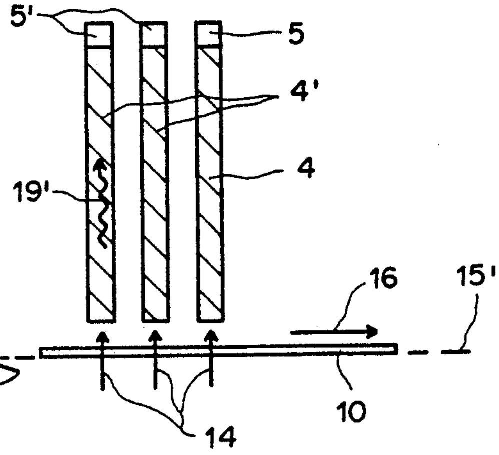
FIG. 8 is a view in section of a testing apparatus with a plurality of collectors.

In FIG. 8, two or more collectors 4 and 4' are arranged in succession in the transport direction 16. Each has its own read-out light beam 14. The bank note 10 is successively scanned in the predetermined spectral ranges. The collectors 4 and 4' are advantageously made from a material which has the predetermined spectral transmission characteristic so that each detector 5 and 5' only receives light 19' from the respective predetermined spectral range.

It is also possible to use read-out light beams 14 which are monochromatic or which are restricted to a predetermined spectral range, with the same effect. For example, as shown in FIG. 4, the colored read-out light beam 14 is produced from white light 19 by means of light guides 26 which are made from a material having the predetermined spectral transmission characteristic.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A testing apparatus for an item in sheet form, the testing apparatus comprising:

a measuring system including a light source for producing a read-out light beam and at least one photosensitive detector for line-by-line optical scanning of the item in at least one predetermined spectral range, wherein the read-out light beam is of a rectangular cross-section and illuminates the item in a read-out area of a scanning plane;

a transport system for transporting the item; and an evaluation device connected to the detector, for converting signals from the detector into measurement values;

wherein the measuring system comprises on one side of the scanning plane an optical collector associated with the detector, and on the other side of the scanning plane, in opposite relationship to the collector, the light source is provided with a diffuser which receives light from said light source and produces said read-out light beam of rectangular cross-section, wherein the transport system comprises two transport units between which the collector and the diffuser form a passage opening for the item, wherein the collector is arranged to collect light which shines through the item in the entire read-out area and to guide said collected light to said photosensitive detector so as to produce a single signal representative of transparency of the item over the entire read-out area, and wherein the evaluation device receives said single signal and is operable to form a single measurement value in respect of transparency in the respective spectral range for the entire read-out area in each scanning operation.

2. A testing apparatus as set forth in claim 1, wherein the transport units and the evaluation device are such that a single signal from the detector is converted into a single measurement value in respect of transparency for the entire read-out area in the evaluation device, before each step with which the item is pushed on through the passage opening by the width of the read-out area.

3. A testing apparatus as set forth in claim 1, including a filter with a predetermined spectral transmission characteristic disposed between the collector and the detector, the detector only having a sensitivity to light whose spectral range is restricted by the filter.

4. A testing apparatus as set forth in claim 1, wherein the collector has a predetermined spectral transmissIon characteristic.

5. A testing apparatus as set forth in claim 3, wherein the evaluation device is arranged to produce a measurement value in respect of transparency for each spectral range which is determined by the predetermined spectral transmission characteristic of the light from each read-out area.

6. A testing apparatus as set forth in claim 4, wherein the evaluation device is arranged to produce a measurement value in respect of transparency for each spectral range which is determined by the predetermined spectral transmission characteristic of the light from each read-out area.

7. A testing apparatus as set forth in claim 1, wherein the light source is of a linear extent of the width of the passage opening.

8. A testing apparatus as set forth in claim 1, wherein the light of the read-out light beam is of a spectral range which is restricted in a predetermined manner.

9. A testing apparatus as set forth in claim 1, including light guides arranged between the light source and the scanning plane to form the read-out light beam.

10. A testing apparatus as set forth in claim 1, including an astigmatic image-forming system oriented transversely with respect to the transport direction and arranged beneath the scanning plane to form the read-out light beam.

11. A testing apparatus as set forth in claim 1, wherein the evaluation device has a memory for storage of the measurement values in respect of transparency which are produced for the predetermined readout area, the memory contains pattern values in respect of each nominal value and in respect of each spectral range of a predetermined set of bank notes, a computing unit of the evaluation device is arranged to compare the pattern values to the corresponding measurement values of the item and to compute a correlation signal, and the evaluation device has an output for providing an output signal.

12. A testing apparatus as set forth in claim 1 wherein said single signal represents the averaged intensity of the collected light over the entire read-out area.

13. A testing apparatus set forth in claim 1 wherein said collector is made from light guide material and is a trapezoidal form tapering towards said detector.

14. A testing apparatus as set forth in claim 1 wherein said collector comprises an astigmatic image-forming system oriented transversely to the transport direction and arranged to guide the collected light to the detector.

15. Device for optically scanning a sheet-like item, comprising

- transport means for transporting the item through a scanning plane,
- at least one source of light in a predetermined spectral range,
- diffusing means associated with said source of light for producing a read-out light beam of rectangular cross-section which illuminates the item in a rectangular read-out area of the item, said light source and said diffusing means being disposed on a first side of said scanning plane,
- a detector responsive to said light in said predetermined spectral range, and
- light collecting means associated with said detector disposed on a second side of said scanning plane for collecting light which passes through the item in the entire read-out area and for guiding the collected light to said detector so as to produce a single signal representative of the transparency of the item to said light in said spectral range over the entire read-out area.

16. The device of claim 15 further comprising evaluation means connected to said detector for receiving said signal and for producing a measurement value representative of the transparency of the item to light in said spectral range averaged over the entire read-out area.

17. The device of claim 15 wherein said read-out area traverses the item.

* * * * *